Sept. 17, 1957  J. SELZER  2,806,736
VEHICLE END GATE AND MOUNTING MEANS THEREFOR
Filed Dec. 31, 1954  2 Sheets-Sheet 1
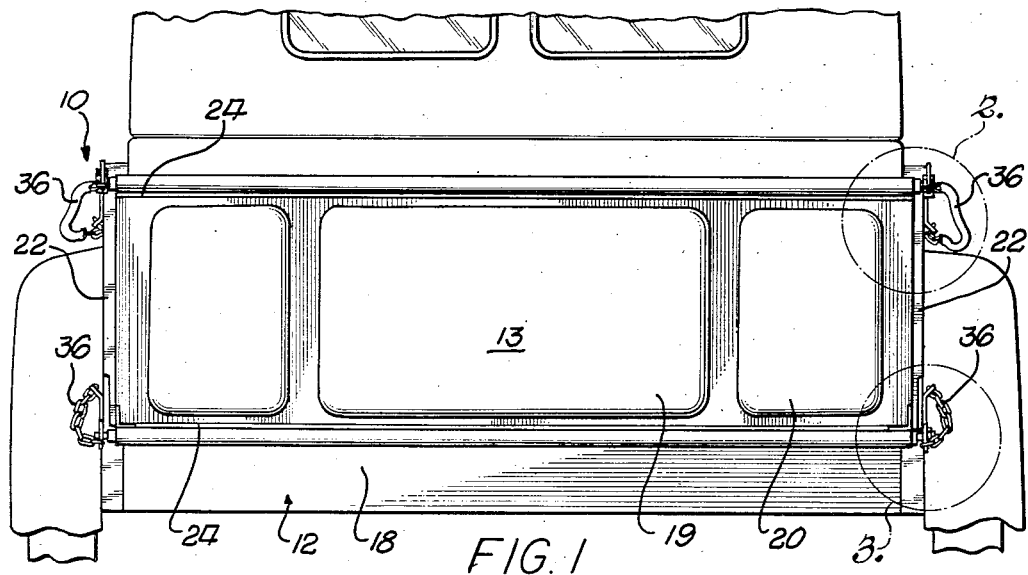
FIG. 1
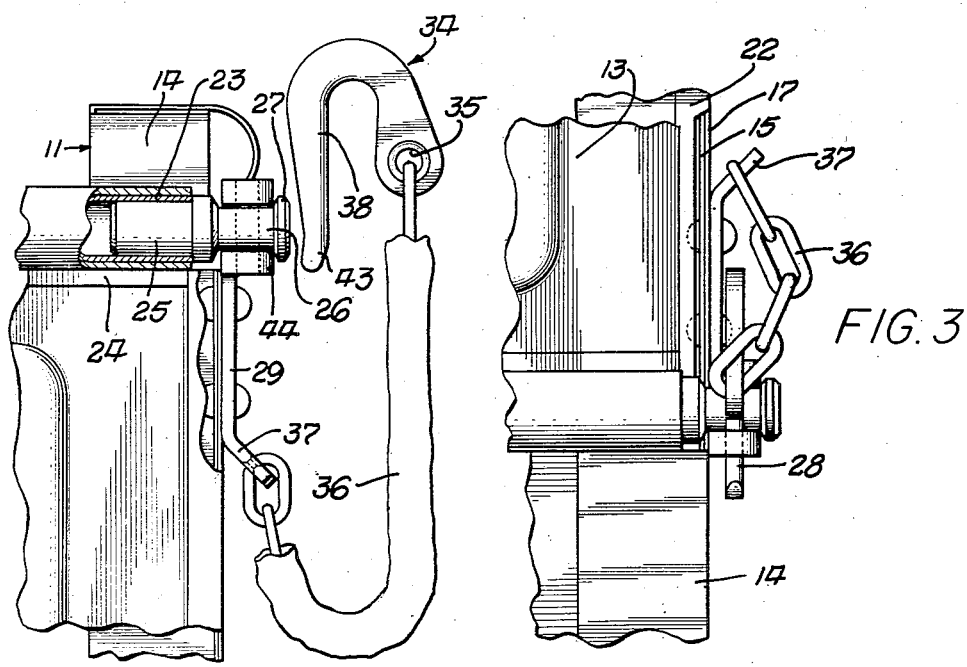
FIG. 2
FIG. 3
INVENTOR
JOHN SELZER
ATTORNEY

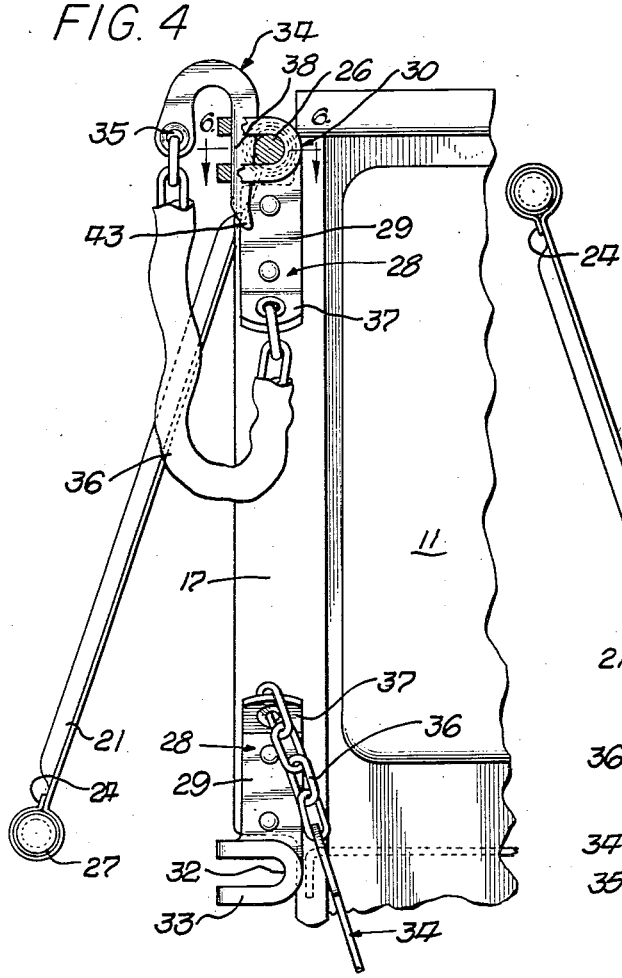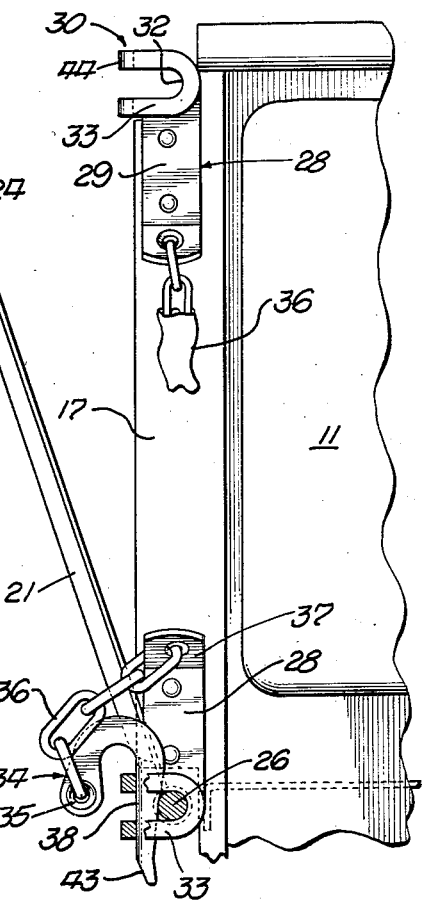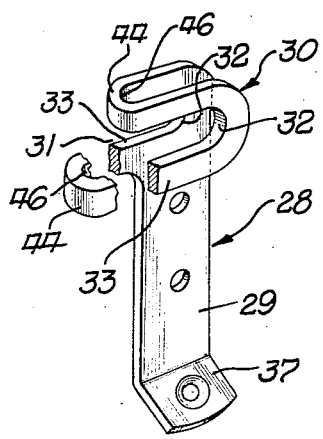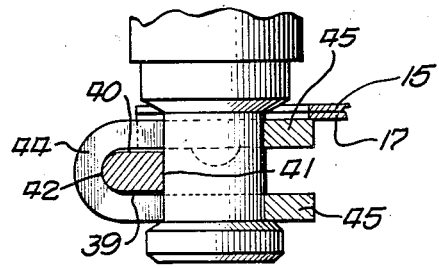
Sept. 17, 1957 — J. SELZER — 2,806,736
VEHICLE END GATE AND MOUNTING MEANS THEREFOR
Filed Dec. 31, 1954 — 2 Sheets-Sheet 2
FIG. 4
FIG. 5
FIG. 7
FIG. 6
INVENTOR
JOHN SELZER
ATTORNEY

United States Patent Office 2,806,736
Patented Sept. 17, 1957

2,806,736

VEHICLE END GATE AND MOUNTING MEANS THEREFOR

John Selzer, Fort Wayne, Ind., assignor to International Harvester Company, a corporation of New Jersey Application December 31, 1954, Serial No. 479,033

3 Claims. (Cl. 296—51)

This invention relates to vehicle bodies, and more particularly, to a new and improved end gate construction and novel means for mounting the end gate on a vehicle body.

An important object of the present invention is to provide an end gate construction which may be swung upon either one of two horizontal, laterally extending axes, located respectively adjacent the upper and lower edges thereof to facilitate loading and unloading of the vehicle body it is associated with.

The invention further contemplates the provision of an end gate for a truck body and means for effectively holding the end gate in its closed position to prevent rattling during the operation of the truck, and also allow the end gate to be quickly and conveniently pivoted about either one of two vertically spaced axes, as the occasion may require. Another object is to provide a pivotally mounted end gate for a pick-up type motor truck body which makes a grain-tight joint with the body in its closed position.

A still further object is to provide an end gate which may be swung upon either of two axes located respectively adjacent the upper and lower edges thereof, and to provide readily releasable means for both the upper and lower edges of the end gate so that either may be selectively released with a minimum of effort to permit pivoting of the end gate about the unreleased edge.

Another important object of the invention is the provision of combination hinge and latch devices for securing an end gate on a vehicle body which will not become dislodged by vibration set up during the operation of the vehicle, and which will maintain the seal between the body and the end gate grain tight.

A still further object is the provision of a tail gate arranged to be pivotally connected to the body at its upper and lower edges by novel connecting means, whereby the end gate may be bodily removed from the vehicle body.

The foregoing and other important objects and desirable features inherent in and encompassed by the invention, together with many of the purposes and uses thereof, will become readily apparent from a reading of the ensuing description in conjunction with the annexed drawings, in which:

Figure 1 is a rear-elevational view of a rear portion of a vehicle showing the end gate in closed position;

Figure 2 is a rear-elevational view of the vehicle shown in Figure 1 showing the upper corner of the body and the latch bolt disengaged from the end gate;

Figure 3 is a view similar to Figure 2 showing the lower corner of the body;

Figure 4 is a side-elevational view of a rear portion of the body showing the end gate in an open position;

Figure 5 is a side-elevational view similar to Figure 4 showing the end gate in another open position;

Figure 6 is a sectional view taken substantially along line 6—6 of Figure 4; and Figure 7 is an enlarged perspective view of a bracket.

Referring to the drawings wherein like reference characters designate like elements throughout the various views, there is shown the rear portion of a conventional pick-up type motor truck body 10. The body 10 is generally illustrated as having a pair of spaced opposite side panels 11, and a horizontal load-supporting floor 12 extending between and suitably connected to the side panels 11. The rear end of the body is open and is adapted to be closed by an end gate 13, in a manner to be described hereinafter. The rear portion of a panel, or side wall, 11 has a laterally, outwardly extending portion, or extension, 14 preferably disposed at a right angle to the panel proper. This portion 14 includes a second extension 15 paralleling but extending away from the panel 11.

A rib, or stake-forming member, having a vertical flange 17 is adapted to be rigidly secured to the extension 15 on the side panel 11. The top edge of the mating flanges 15 and 17 is vertically spaced below the top edge of the lateral extension 14, and similarly, the bottom edge of the extension 15 and flange 17 is vertically spaced above the lower edge of the extension 14, for a purpose which will be pointed out hereinafter. It will be noted that the lateral extensions 14 of the side panels, or walls, 11 and the rear edge 18 of the load-supporting floor 12 lie in substantially a vertical plane extending transversely of the vehicle body 10. The association between the extension 15 and the vertical flange 17 is such as to provide a double-thickness wall portion offset laterally from the panel proper.

The end gate 13 includes a single metal sheet 19 having a generally rectangular shape. The metal sheet 19 is provided with suitable depressions 20 which serve to rib the end gate and strengthen and rigidify the same. The outwardly facing ends 21 of the end gate 13 lie respectively in substantially the same vertical planes as the lateral extensions 15, and are adapted to abut the extensions 15, as shown in Figure 1, when the end gate 13 is in its closed position. Each end of the end gate 13 is provided with an oppositely extending flange 22 which overlaps the respective extensions 15 when the end gate is in the position shown in Figures 1 and 2. It is to be understood that the flanges 22, ends 21, and metal sheet 19 are formed from a single piece of material. The normally upper and lower of the edges of the end gate 13 are formed by wrapping the metal sheet 19 substantially completely around laterally extending tubular reinforcing members 23, and the top and bottom extremities of the metal sheet 19 are in the form of tabs 24 which are welded to the metal sheet 19. A bearing plug 25 is pressed-fit into the end of each of the reinforcing tubular members 23, and includes a reduced diameter portion 26. The end of each reduced diameter portion is spaced laterally from a respective outwardly facing end 21, and is provided with an enlarged head 27.

A bracket 28 is riveted to the outer face of the vertical flange 17 adjacent its upper and lower ends. Each bracket 28 includes an elongated plate-like mounting portion 29 and a bearing portion 30. Each bearing portion 30 is formed to provide a horizontal slot 31. The rearwardmost end of the slot is open, and the forward end of the slot is defined by a pair of semi-cylindrical surfaces 32 of the bracket 28. The radius of curvature of the semi-cylindrical surfaces 32 is substantially equal to, or slightly larger than, the radii of the reduced diameter portions 26. The two lower horizontally extending legs 33 of the U-shaped bearing portions 30 serve as supporting ledges for engaging a respective reduced diameter portion 26, which is received in a respective slot 31 when the end gate 13 is mounted on the body 10.

In order to prevent removal of the reduced diameter portions 26 from their respective slots 31, each bracket 28 is provided with a latch member designated generally by numeral 34. The latch members 34 are hook-shaped, and one end thereof is provided with an aperture 35 to which one end of a chain 36 is attached. The other end of the chain 36 is connected to an off-set tab 37 integrally formed on the end of the plate-like portion 29 of each bracket opposite the bearing portion 30. The chains 36 not only prevent loss of the latch members 34 but also serve to position the end gate 13 in its open positions, as will be pointed out hereinafter. Each latch member 34 includes an elongated latch bolt 38 having a somewhat rectangular cross section, as shown in Figure 6. It will be noted from Figure 6 that two sides 39, 40 remain substantially parallel the entire length of the latch bolt 38, while one of the other sides 41 is flat but extends away from the opposite side 42 from the tip portion 43 of the latch bolt 38 to its opposite end. It will be also noted that side 42 of each latch bolt 38 is semi-circular in cross section, and the radius of curvature remains substantially constant the entire length of the latch bolt 38. As best shown in Figure 6, the bearing portion 30 of each bracket 28 is U-shaped in plan, and the bight portions 44 integrally connecting the upper legs 45 and the lower legs 33 have semi-cylindrical inner surfaces 46 provided with substantially the same radii of curvature as semi-cylindrical sides 42.

In operation, in order to assemble the end gate 13 on the vehicle body 10, the operator merely inserts each reduced diameter portion 26 in the slot 31 of a respective bracket 28. Thereafter, the tip portion 43 of the latch members 34 are inserted in the space between the inner surfaces 46 of the bight portions 44, and the reduced diameter portions 26. It is to be understood that the curved side 41 of each latch bolt 38 is positioned to engage the inner surface 46 of the bight portion of the upper legs 45 of a respective bracket 28. Thereafter, by moving the latch bolts 38 vertically downwardly with respect to the bearing portions 30, the reduced diameter portions 26 are urged toward the semi-cylindrical surfaces 32 as the latch bolts 38 are urged downwardly to extend between the lower horizontally extending legs 33, since, as stated hereinbefore, the latch bolts are wedge-shaped.

The semi-cylindrical surfaces 32 are spaced with respect to the transverse vertical plane containing the lateral extensions 14 and a rear edge 18 of the floor 12, such that when the reduced diameter portions 26 are seating against their respective semi-cylindrical surfaces 32, the side marginal edges of the normally inner face of the end gate 13 and the lower edge thereof tightly abut the lateral extensions 14 and the rear edge 18 of the floor 12, respectively; and thus a grain-tight seal is obtained between the end gate 13 and the vehicle body 10. Thus, it will be appreciated that when the latch bolts 38 bridge the upper and lower legs 33, 45, respectively, the reduced diameter portions 26 are prevented from being withdrawn from the slots 31, and the end gate 13 is locked in place on the vehicle body 10. However, because of the inclined side 42 of each latch bolt 38, continued vertical movement thereof downwardly causes the inclined surface 42 of each latch bolt 38 to cam the reduced diameter portions 26 into firm abutting engagement with its semi-cylindrical surface 32. Inasmuch as the latch bolts 38 are firmly wedged between the bight surfaces 46 and the reduced diameter portion 26, the latch members 34 are prevented from moving upwardly with respect to the brackets 28, even though extreme vibrations may be set up in the vehicle body during operation of the vehicle, and hence the end gate 13 is maintained in firm abutting engagement with the extensions 14 and rear edge 18.

The end gate 13 is moved to one of its opened positions by merely withdrawing the uppermost pair of latch members 34 from engagement with their respective brackets 28. Thereafter, the gate 13 may be swung about a substantially horizontal, laterally extending axis extending through the lowermost bearing plugs 25 to a substantially horizontal position. The uppermost latch members 34 are then hooked over the reduced diameter portions 26 and the tail gate is held in opened position by the covered chains 36. Alternatively, when the end gate 13 is mounted on a vehicle body 10 capable of being tilted to a dumping position, the lowermost latch members 34 are disengaged from their respective brackets 28, while the upper most latch members 34 remain in their locked position with their respective brackets 28. Thus, when the vehicle body is tilted to its dumping position, the end gate 13 is free to swing about a horizontal axis extending through the uppermost bearing plugs 25, and the lowermost latch members 34 may be hooked over the released bearing plugs 25 to control the dumping or discharging of the load from the vehicle body. It will also be appreciated that by releasing all of the latch members 34 from engagement with their respective brackets 28, the end gate may be bodily removed from the vehicle body 10 in instances where it interferes with the load, as when hauling lumber and large objects which extend beyond the rear edge of the vehicle body.

The embodiment of the invention chosen for the purpose of illustration and description herein is that preferred, based upon the requirements for achieving the objects of the invention and developing the utility thereof in the most desirable manner, due regard being had to existing factors of economy, simplicity of design and construction and the improvements sought to be effected. It will be appreciated, therefore, that the particular structural and functional aspects emphasized herein are not intended to exclude but rather to suggest such other adaptations and modifications of the invention as fall within the spirit and scope of the invention as defined in the appended claims.

What is claimed is:

1. In a pick-up type motor truck body having a pair of laterally spaced, upright side panels and a floor extending between and connected to said side panels, said floor and panels having rear edge portions lying in a common laterally extending vertical plane; a rectangular end gate; and means for mounting said end gate on said body for vertical swinging movement about either one of a pair of vertically spaced horizontal axes to open positions from a closed position wherein a marginal edge portion of said end gate abuts said rear edge portions of said floor and panels including a pair of combination hinge and latch structures, each of said structures including a pair of transversely aligned cylindrical pivot pins extending laterally from respective corners of said end gate, a bracket for each pivot pin secured to a respective panel, said bracket being provided with a rearwardly opening, longitudinally extending slot for receiving a respective pivot pin when said end gate is in its closed position, the closed end of said slot being defined by semi-cylindrical surfaces of said bracket having substantially the same radius of curvature as said pivot pins, each of said brackets being U-shaped in plan with the bight portion thereof rearwardly of the leg ends, a latch bolt associated with each bracket, said latch bolts being insertable vertically between the legs of said brackets to extend therethrough and be disposed between said bight portions and said pivot pins to prevent removal of said pivot pins from said slots, said latch bolts having cam sections for forcing said pivot pin tightly against said semi-cylindrical surfaces during insertion of said latch bolts through said brackets.

2. In a vehicle body having a pair of laterally spaced, upright side panels and a floor extending between and connected to said side panels; an end gate; and means for mounting said end gate on said body for vertical swinging movement about either one of a pair of vertically spaced, horizontal axes to open positions from a closed position wherein a marginal edge portion of said end gate is disposed closely adjacent to edge portions of said floor and panels including a pair of combination hinge and latch structures, each of said structures including transversely aligned pivot pins extending laterally from the sides of said end gate, a bracket for each pivot pin secured to a respective panel, said brackets being provided with a rearwardly opening, a longitudinally extending slot for receiving a respective pivot pin when said end gate is in its closed position, the closed end of said slot being defined by semi-cylindrical surfaces of said bracket, each of said brackets being U-shaped in plan with the bight portion thereof rearwardly of the leg ends, and a wedge-shaped latch bolt associated with each bracket, said latch bolts being insertable vertically downwardly between the legs of said brackets to extend therethrough and be disposed between said bight portions and said pivot pins to prevent removal of said pins from said slots, said latch bolts being adapted to force said pivot pins into abutting engagement with said semi-cylindrical surfaces upon continued downward movement thereof.

3. In a vehicle body having a pair of laterally spaced, upright side panels and a floor extending between and connected to said side panels; an end gate; and means for removably mounting said end gate on said body wherein a marginal edge portion of said end gate is closely adjacent to edge portions of said floor and panels including a pair of transversely aligned projections extending laterally from the sides of said end gate, a bracket for each projection secured to a respective panel having a bifurcated portion, said projections being received in said bifurcated portions to be supported thereby when said end gate is mounted on said body, said bifurcated portions having forwardly opening vertically aligned longitudinally extending slots therein, manually operated latch means insertable through said vertically aligned slots of said bifurcated portions and positionable between the surfaces of said bifurcated portions defining the closed ends of said vertically aligned slots and an associated projection to prevent removal of said projections from said bifurcated portions, and cam means carried by said latch means and tangentially engageable with said associated projection for urging said end gate marginal edge portion tightly into abutting engagement with said edge portions of said floor and panels upon insertion of said latch means through said vertically aligned slots of said bifurcated portions.

References Cited in the file of this patent

UNITED STATES PATENTS

| | | |
|---|---|---|
| 2,333,925 | Grossett | Nov. 9, 1943 |
| 2,392,906 | Doyle | Jan. 15, 1946 |
| 2,502,079 | Duis et al. | Mar. 28, 1950 |
| 2,502,093 | Johnson | Mar. 28, 1950 |

FOREIGN PATENTS

| | | |
|---|---|---|
| 462,068 | Great Britain | Mar. 2, 1937 |